United States Patent
Gaus, Jr. et al.

(10) Patent No.: US 6,885,338 B2
(45) Date of Patent: Apr. 26, 2005

(54) ADAPTIVE DIGITAL BEAMFORMER COEFFICIENT PROCESSOR FOR SATELLITE SIGNAL INTERFERENCE REDUCTION

(75) Inventors: Richard C. Gaus, Jr., Burnt Hills, NY (US); Naofal Al-Dhahir, Morristown, NJ (US)

(73) Assignee: Lockheed Martin Corporation, Gaithersburg, MD (US)

( * ) Notice: Subject to any disclaimer, the term of this patent is extended or adjusted under 35 U.S.C. 154(b) by 398 days.

(21) Appl. No.: 10/035,646

(22) Filed: Dec. 28, 2001

(65) Prior Publication Data

US 2002/0171580 A1 Nov. 21, 2002

Related U.S. Application Data

(60) Provisional application No. 60/259,121, filed on Dec. 29, 2000.

(51) Int. Cl.[7] ................................................. H01Q 3/00
(52) U.S. Cl. ........................ 342/377; 342/373; 381/93
(58) Field of Search ............................... 342/368, 373, 342/377, 378, 383; 381/93, 94.1; 367/119, 121

(56) References Cited

U.S. PATENT DOCUMENTS

| | | | |
|---|---|---|---|
| 3,763,490 A | 10/1973 | Hadley et al. | |
| H374 H * | 11/1987 | Abo-Zena et al. | 342/378 |
| 5,268,927 A | 12/1993 | Dimos et al. | |
| 5,274,386 A | 12/1993 | Pellon | |
| 5,420,593 A | 5/1995 | Niles | |
| 5,592,173 A | 1/1997 | Lau et al. | |
| 5,781,156 A | 7/1998 | Krasner | |
| 5,874,914 A | 2/1999 | Krasner | |
| 5,923,287 A | 7/1999 | Lennen | |
| 5,955,987 A | 9/1999 | Murphy et al. | |
| 6,317,501 B1 * | 11/2001 | Matsuo | 381/92 |
| 6,446,008 B1 * | 9/2002 | Ozbek | 702/17 |
| 6,498,581 B1 * | 12/2002 | Yu | 342/90 |
| 6,594,367 B1 * | 7/2003 | Marash et al. | 381/92 |
| 6,651,007 B1 * | 11/2003 | Ozbek | 702/17 |

* cited by examiner

*Primary Examiner*—Dao Phan
(74) *Attorney, Agent, or Firm*—Finnegan, Henderson, Farabow, Garrett & Dunner, L.L.P.

(57) ABSTRACT

Filter coefficients of a beamformer are computed based on a segment of input samples. The segment of input samples is divided into a plurality of blocks of input samples wherein the plurality of blocks of input samples are received by a shared memory at a first rate. The first block of the plurality of blocks is received in the shared memory at a first time. The plurality of blocks of input samples from the shared memory are read out at a second rate wherein the first block of the plurality of blocks is read from the shared memory at a second time. A plurality of partial covariance matrices for the plurality of blocks read from the shared memory are computed and added together to determine a covariance matrices used to compute the filter coefficients.

8 Claims, 5 Drawing Sheets

ADAPTIVE DIGITAL BEAMFORMER COEFFICIENT PROCESSOR FOR SATELLITE SIGNAL INTERFERENCE REDUCTION

CROSS-REFERENCE TO RELATED APPLICATION

This application claims the priority benefit of U.S. Provisional Application No. 60/259,121, filed on Dec. 29, 2000, which is incorporated herein by reference.

FIELD OF THE INVENTION

The present invention relates to a method and apparatus for reducing interference in a received satellite signal using real-time signal processing.

BACKGROUND OF THE INVENTION

Navigational aides, such as those devices used in automobiles to assist drivers in locating destinations, have become very popular in recent years. These navigational aides work by receiving satellite signals from systems such as the Global Positioning System (GPS). GPS consists of 24 satellites that orbit the earth and transmit signals to these navigational aides. A navigational aide processes these signals to determine, for example, the location of a driver and, based on the driver's location, the navigational aides may provide directions to the driver's destination. In addition to navigational devices, GPS provides means for automatic vehicle location systems, aircraft landing systems, and precision timing systems. These devices have both commercial and military applications.

However, the satellite signals on which these devices rely are transmitted at a very low power level and are therefore susceptible to unintentional and intentional interference. Sources of unintentional interference include cellular phones and television stations transmitting antennas. Intentional interference (jamming) is accomplished by intentionally producing signals to interfere with the satellite signals transmitted.

When interference occurs, the performance of devices that rely on the satellite signals degrades. To maintain or improve the performance of these devices in the presence of interference, GPS receivers must be designed to cancel or minimize the interference.

For a significant reduction of the effects of interference to a desired satellite signal, a hardware implementation of digital filters operating on analog-to-digital sampled data from the satellite receiver's intermediate frequency may be required. The digital filters require numerical coefficients that are derived from the incoming sampled data and are applied to the filters in real-time. However, in conventional systems the hardware needed to store the sampled data is very costly and computationally inefficient. Therefore, there is a need for a GPS receiver that may cancel or minimize interference in a cost effective and computationally simplified manner.

SUMMARY OF THE INVENTION

A method for computing filter coefficients of a beamformer based on a segment of input samples. The method comprising the steps of dividing the segment of input samples into a plurality of blocks of input samples and receiving the plurality of blocks of input samples in a shared memory at a first rate wherein a first block of the plurality of blocks is received in a shared memory at a first time. The method further comprises reading the plurality of blocks of input samples from the shared memory at a second rate wherein the first block of the plurality of blocks is read from the shared memory at a second time. Still further, the method comprises computing a plurality of partial covariance matrices for the plurality of blocks read from the shared memory and adding the plurality of partial covariance matrices.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
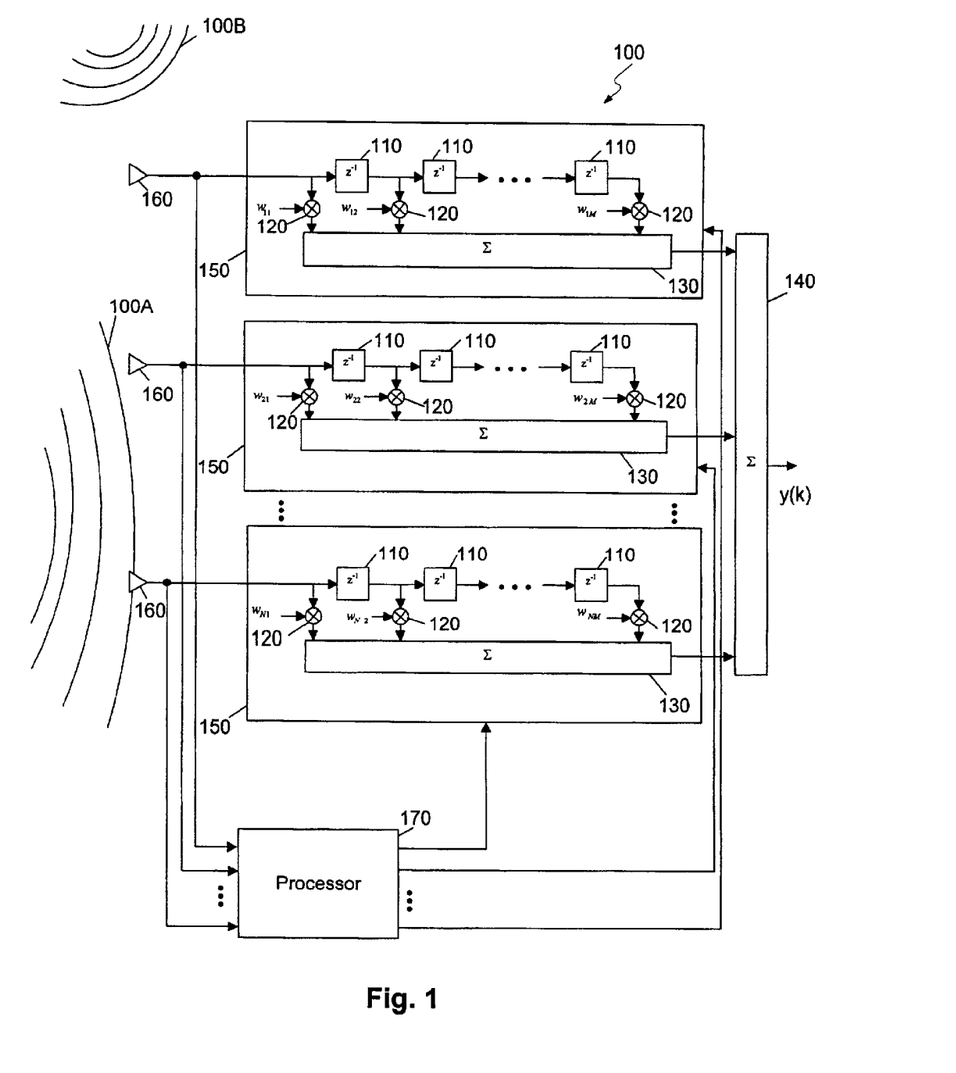
FIG. 1 illustrates an exemplary embodiment of a spatial temporal adaptive processing (STAP) beamformer.

FIG. 1 depicts an exemplary embodiment of a spatial temporal adaptive processing (STAP) beamformer 100. The beamformer 100 may comprise N antenna elements 160 to receive one or more satellite signals 100A arriving at the antenna elements 160 in one or more directions. In addition to satellite signals 100A, the N antenna elements may also receive one or more interference signals 100B arriving at the antenna elements 160 from one or more directions. Each antenna element 160 is connected to a multiple tapped delay line structure 150 comprising M taps. Each of the multiple tapped delay line structures 150 may comprise M-1 delay elements 110, M multipliers 120, and an adder 130. Generally, each of the multiple tapped delay structures 150 may have an FIR structure.

Although not shown in FIG. 1, the signals 100A, 100B received by each antenna elements 160 may undergo pre-processing prior to being received by the multiple tapped delay line structures 150 and a coefficient processor 170. For example, signals received by each antenna elements 160 may be filtered by a preselection filter and down-converted to baseband or other IF frequency. Further, the signals may be filtered by a bandlimited filter and sampled by an analogto-digital converter prior. Still further, the baseband filtered sampled signals may be further converted to complex baseband signals by digital demodulation or Hilbert transform type processing, for example, prior to being input to the multiple tapped delay line structures 150 and the coefficient processor 170.

The beamformer 100 receives input signals 100A, 100B and computes filter coefficients, $w_{nm}$, which are applied to the multiple tapped delay line structures 150 for processing the input signals. The signals at the taps in the multiple tapped delay line structures 150 are weighted by corresponding filter coefficients, $w_{nm}$, and the resulting products are summed by adders 130 producing an output signal for each multiple tapped delay line structure 150. The filter coefficients, $w_{nm}$, are computed by the coefficient processor 170, which will be discussed in greater detail below. The outputs from each of the multiple tapped delay line structures 150 are then summed together by an adder 140 to generate output samples, y(k).

The output samples, y(k), of the beamformer 100 may be expressed by the following equation:

$$y(k) = \sum_{n=1}^{N} \sum_{m=1}^{M} w_{nm}^* x_n(k - (m-1)) \quad (1)$$

where $x_n(k)$ denotes a complex input sample from the n-th antenna element at time k. It is assumed that at the n-th antenna element, the satellite signal is multiplied by a factor $e^{-j\Delta_n}$. The exponent factor, $\Delta_n$, depends on the angle of arrival of the satellite signal, the carrier frequency of the satellite signal, and the position of the n-th antenna element. More specifically, $\Delta_n = \omega_c \tau_n$, where $\omega_c$ is the carrier frequency of the satellite signal and $\tau_n$ is the inter-element time delay at antenna element n. If the steering vector for a given satellite direction is denoted by $\lfloor e^{-j\Delta_1} e^{-j\Delta_2} \ldots e^{-j\Delta_N} \rfloor$, then the input samples, $x_n(k)$, may be expressed in the z-space by the following equation:

$$X_n(z) = e^{-j\Delta_n} e^{-j\omega\tau_n} V(z) \quad (2)$$

where ω is the baseband frequency of processed satellite signal received by the multiple tapped delay line structures 150 and a coefficient processor 170 and V(z) is the z-space representation of the satellite signal at a first antenna element.

To minimize the effects of interference signals 100B on the GPS receiver, the expected power, P, of the complex output samples, y(k), of the beamformer 100 may be minimized according the following equation:

$$P = E\{|y(k)|^2\} \quad (3)$$

$$= E\left\{\left(\sum_{n=1}^{N}\sum_{m=1}^{M} w_{nm}^* x_n(k-(m-1))\right)\left(\sum_{i=1}^{N}\sum_{j=1}^{M} w_{ij} x_i^*(k-(j-1))\right)\right\}$$

$$= E\left\{\sum_{n=1}^{N}\sum_{m=1}^{M}\sum_{j=1}^{M}\sum_{i=1}^{N} w_{nm}^* x_n(k-(m-1)) x_i^*(k-(j-1)) w_{ij}\right\}$$

The expected power, P, may be simplified by rearranging the input samples and weights into the following (N×M)×1 vectors:

$$\tilde{x}(k) = \begin{bmatrix} x_1(k) \\ x_1(k-1) \\ \vdots \\ x_1(4) \\ x_2(k) \\ x_2(k-1) \\ \vdots \\ x_2(4) \\ \vdots \\ x_N(k) \\ x_N(k-1) \\ \vdots \\ x_N(4) \end{bmatrix} \text{ and} \quad (4)$$

$$\tilde{w} = \begin{bmatrix} w_{11} \\ w_{12} \\ \vdots \\ w_{1M} \\ w_{21} \\ w_{22} \\ \vdots \\ w_{2M} \\ \vdots \\ w_{N1} \\ w_{N2} \\ \vdots \\ w_{NM} \end{bmatrix} \quad (5)$$

In matrix notation, the output samples, y(k), of the beamformer 100 may be expressed as follows:

$$y(k) = \tilde{w}^H \tilde{x}(k) \quad (6)$$

The resulting expected output power, P, is given by:

$$P = E\{|y(k)|^2\} = E\{(\tilde{w}^H \tilde{x}(k))(\tilde{x}^H(k)\tilde{w})\}$$

$$= \tilde{w}^H E\{\tilde{x}(k)\tilde{x}^H(k)\}\tilde{w} = \tilde{w}^H R_{\tilde{x}\tilde{x}} \tilde{w} \quad (7)$$

where $R_{\tilde{x}\tilde{x}}$ is a covariance matrix. Before determining the minimum expected output power, P, at least one constraint may be imposed to avoid the trivial solution of zeros for the filter coefficients, $\tilde{w}$. Accordingly, equation (7) may be minimized subject to the following constraint:

$$C^H \tilde{w} = F \quad (8)$$

where C is a constraint weighting matrix and F is a constraint solution vector. The constraint weighting matrix, C, may be an (N×M)×L matrix and constraint solution vector, F, may be an L×1 matrix. Accordingly, the interference minimization problem my be characterized as follows:

minimize $P = \tilde{w}^H R_{\tilde{x}\tilde{x}} \tilde{w}$ subject to $C^H \tilde{w} = F$ The filter coefficients, $\tilde{w}$, that may solve the interference minimization problem may be determined by the following equation:

$$\tilde{w} = R_{\tilde{x}\tilde{x}}^{-1} C [C^H R_{\tilde{x}\tilde{x}}^{-1} C]^{-1} F \quad (9)$$

Conventional coefficient processors receive and store a predetermined number of input samples prior to computing the covariance matrix, $R_{\tilde{x}}\tilde{x}$. For example, for a beamformer 100 having four antenna elements 160 (i.e., N=4) and five taps (i.e., M=5), the conventional coefficient processor may receive and store four thousand complex input samples prior to computing the covariance matrix, $R_{\tilde{x}}\tilde{x}$. Because the input samples are complex, the coefficient processor may require a memory device having eight thousand memory locations. Further, conventional coefficient processors are computationally intensive. In the above example, the conventional coefficient processor computes the inversion of a 20×20 covariance matrix, $R_{\tilde{x}}\tilde{x}$, and solves a 20-by-20 system of linear equations to compute the optimum filter coefficients, $\tilde{w}$.

Figure 2:
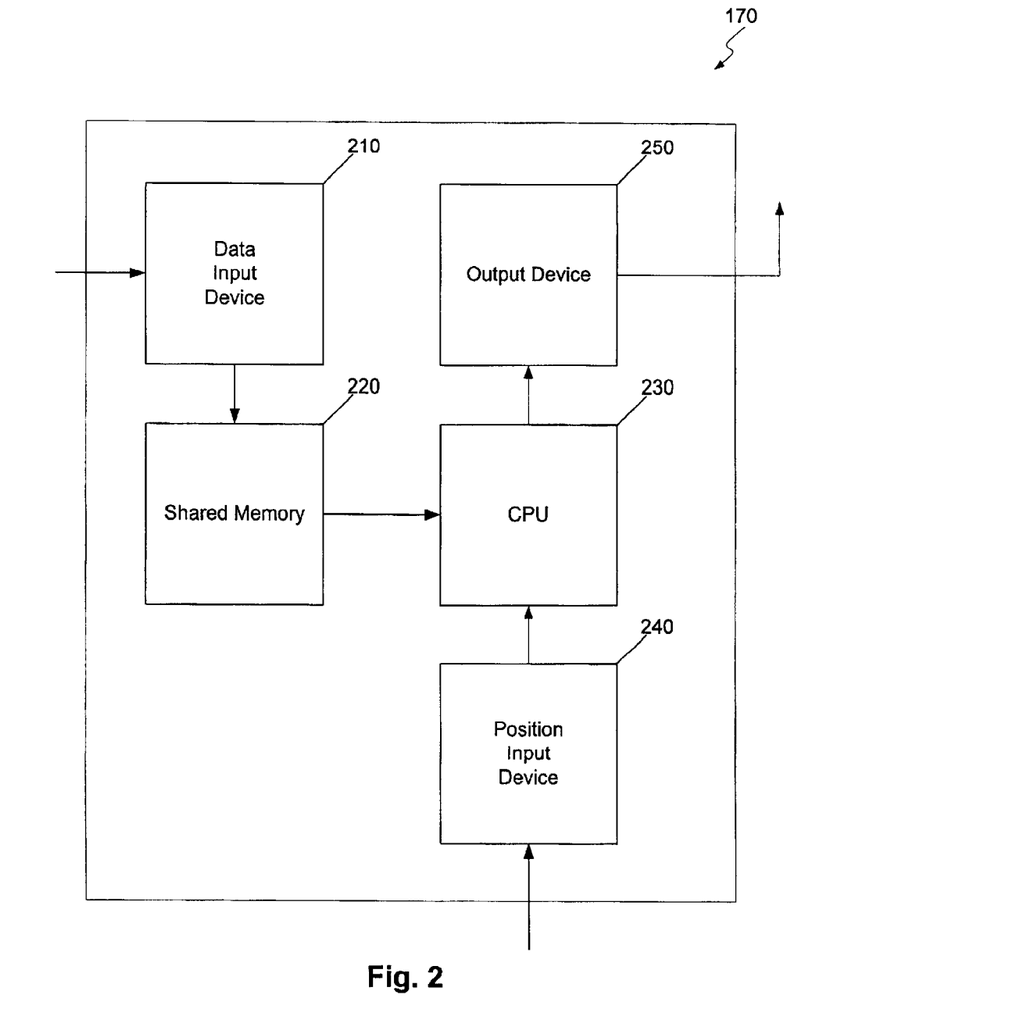
FIG. 2 illustrates an exemplary block diagram of a coefficient processor.

FIG. 2 illustrates a first embodiment of the coefficient processor 170 according to the present invention. The coefficient processor 170 is a computationally efficient processor for computing the covariance matrix, $R_{\tilde{x}}\tilde{x}$. Further, the coefficient processor 170 is less costly than conventional coefficient processors because coefficient processor 170 requires less memory storage to compute the covariance matrix, $R_{\tilde{x}}\tilde{x}$. Coefficient processor 170 may comprise a data input device 210 to receive sampled input signals from the antenna elements 160, a shared memory device 220 to store the input samples, a CPU 230 to compute the filter coefficients, $\tilde{w}$, a position input device 240 to receive satellite position data, and an output device 250 to output the filter coefficients, $\tilde{w}$, to the multiple tapped delay line structures 150 of the digital beamformer 100. The CPU 230 may compute the covariance matrix, $R_{\tilde{x}}\tilde{x}$, by computing a plurality of partial covariance matrices, $R_{\tilde{x}}\tilde{x}^i$, and adding the partial covariance matrices, $R_{\tilde{x}}\tilde{x}^i$, together to compute the covariance matrix, $R_{\tilde{x}}\tilde{x}$.

More specifically, the elements, $r_{ij}$, of a covariance matrix, $R_{\tilde{x}}\tilde{x}$, of an N×S matrix where a sample in the N×S matrix is designated as $a_{ij}$, where the subscript i refers to i-th row of the N×S matrix and j refers to the j-th column in the N×S matrix, may be determined based on the following equation:

$$r_{ij} = \sum_{k=1}^{N} a_{ki}^* a_{kj} \text{ for } 1 \leq i \leq S \text{ and } 1 \leq j \leq S \qquad (10)$$

where the term $a^*_{ki}$ is the complex conjugate of $a_{k1}$. The computation of the elements, $r_{ij}$, of the covariance matrix, $R_{\tilde{x}}\tilde{x}$, may be broken up into a sum of parts by dividing the N×S matrix into L sub-matrices where all L sub-matrices may have an M rows and S columns. Accordingly, the elements, $r_{ij}$, of the covariance matrix, $R_{\tilde{x}}\tilde{x}$, may be determined based on the following equation having L individual summation terms:

$$r_{ij} = \sum_{k=1}^{M} a_{ki}^* a_{kj} + \sum_{k=M+1}^{2M} a_{ki}^* a_{kj} + \cdots + \sum_{k=(L-1)M+1}^{LM} a_{ki}^* a_{kj} \qquad (10)$$

Each summation represents a partial covariance computation. Accordingly, the CPU 230 may compute the covariance matrix, $R_{\tilde{x}}\tilde{x}$, by computing a plurality of partial covariance matrices, $R_{\tilde{x}}\tilde{x}^i$, and adding the partial covariance matrices, $R_{\tilde{x}}\tilde{x}^i$, together to compute the covariance matrix, $R_{\tilde{x}}\tilde{x}$. The CPU 230 may then compute the filter coefficients, $\tilde{w}$, according to equation (9) above.

Figure 3:
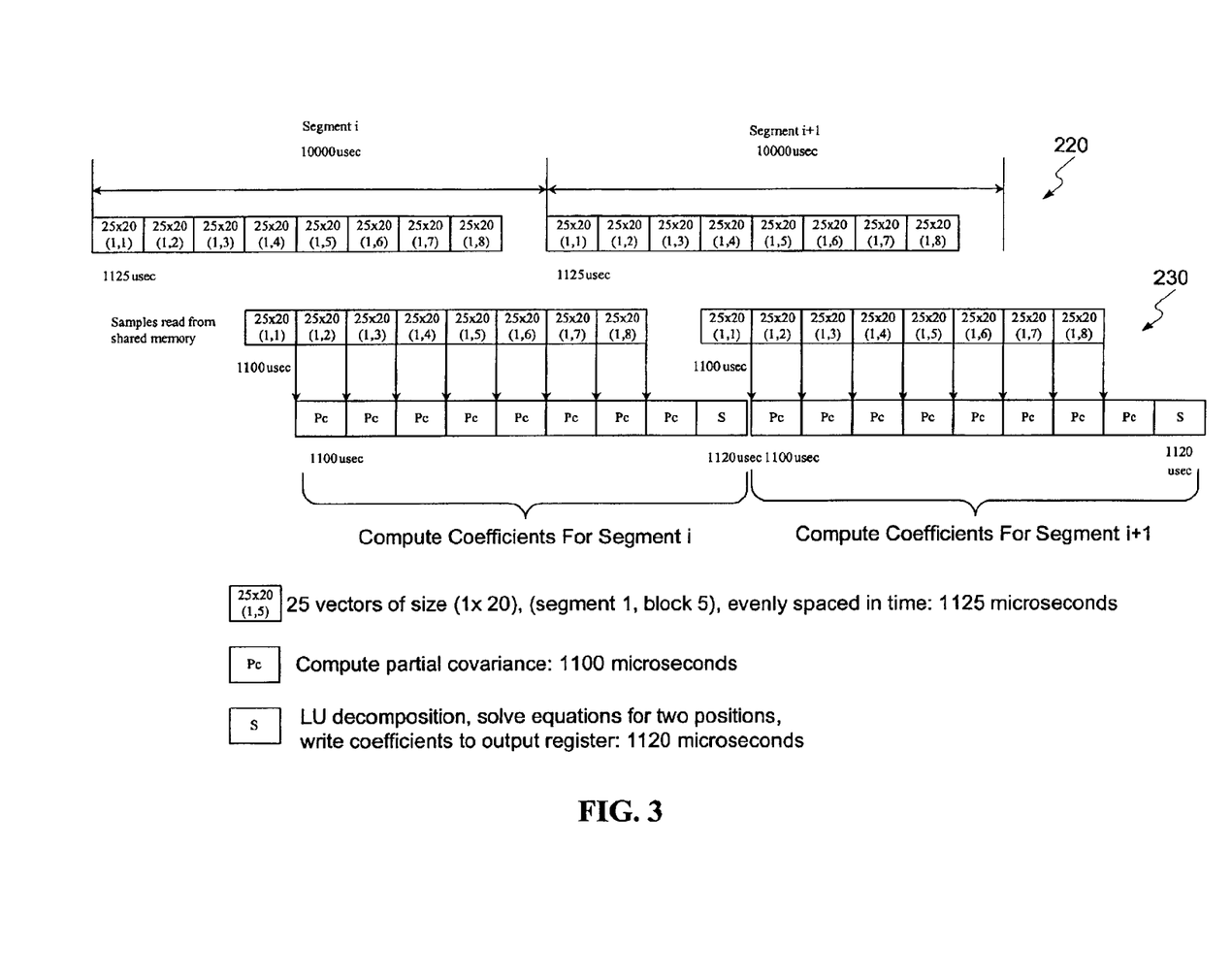
FIG. 3 illustrates an exemplary method for computing filter coefficients for the beamformer of FIG. 1 using the coefficient processor of FIG. 2.

FIG. 3 illustrates a method used by the coefficient processor 170 of FIG. 2 to compute the covariance matrix, $R_{\tilde{x}}\tilde{x}$, for segments of input samples. Continuing with the example of a beamformer 100 having four antenna elements 160 (i.e., N=4) and five taps (i.e., M=5), the segments may consist of four thousand complex input samples grouped in eight blocks of 25×20 matrices. A block of 25 by 20 input samples may comprise twenty-five vectors having twenty input samples. The twenty input samples may consist of five input samples from each antenna element 160. More specifically, a block of 25 by 20 input samples may consist of the following input samples:

$$\begin{bmatrix} x_1(k-120) & x_1(k-121) & \cdots & x_1(k-124) & x_2(k-120) & \cdots & x_4(k-120) & \cdots & x_4(k-124) \\ \vdots & \vdots & \vdots & \vdots & \vdots & \vdots & \vdots & \vdots & \vdots \\ x_1(k-5) & x_1(k-6) & \cdots & x_1(k-9) & x_2(k-5) & \cdots & x_4(k-5) & \cdots & x_4(k-9) \\ x_1(k) & x_1(k-1) & \cdots & x_1(k-4) & x_2(k) & \cdots & x_4(k) & \cdots & x_4(k-4) \end{bmatrix}$$

As shown in FIG. 3, the shared memory device 220 and the CPU 230 operate in parallel. That is, as the shared memory device 220 receives blocks of input samples for an i-th segment of input samples, the CPU 230 reads the blocks of input samples and processes the blocks of input samples to compute a covariance matrix, $R_{\tilde{x}}\tilde{x}$, for the i-th segment of input samples. As shown in FIG. 3, the shared memory a device 220 may continuously receive input samples at a rate equal to 1125 microseconds per block of input samples, for example.

The CPU 230 may not read a first block of input samples of the i-th segment to begin computing the covariance matrix, $R_{\tilde{x}}\tilde{x}$, for the i-th segment until a time after the first block of input samples has been received by the shared memory device 220. The purpose of the time delay may be to permit incoming input samples to fill the shared memory device 220 at a rate less than or equal to the rate the input samples are read by the CPU 230. In this way, blocks of input samples may always be available for processing by the CPU 230. To determine the number of blocks that may be stored in shared memory device 220 before the CPU 230 may read blocks of input data from the shared memory device 220 so that blocks of input samples may always be available for processing by the CPU 230, let the following variable be defined as follows:

$N_s$=the number of blocks of samples in a segment of input samples;

$N_c$=the number of blocks of samples in the shared memory device 220 for a segment before a first block of input samples is read by the CPU 230;

$T_w$=the time to write a block of input samples to the shared memory device 220;

$T_r$=the time to read a block of input samples from the shared memory device 220 by the CPU 230; and $T_s$=the time of one segment of input samples.

At a time $t=N_sT_w$, the number of blocks of input samples remaining in the shared memory device 230, $N_m$, may be given by the following equation:

$$N_m = N_s - \left(\frac{1}{T_r}\right)(N_s T_w - N_c T_w) \quad (11)$$

For blocks of input samples to be available for processing by the CPU 230, the number of blocks of input samples remaining in the shared memory device 230, $N_m$, at a time $t=N_sT_w$ should be greater than or equal to zero. Accordingly, based on equation (1), the of number of blocks, $N_c$, that may be stored in shared memory device 220 before the CPU 230 may read blocks of input data from the shared memory device 220 so that blocks of input samples may always be available for processing by the CPU 230 may be determined based on the following equation:

$$N_c \geq N_s\left(1 - \frac{T_r}{T_w}\right) \quad (12)$$

For the embodiment of FIG. 3, where $N_s=8$, $T_w=1125$ microseconds, $T_r=1100$ microseconds, and $T_s=10000$ microseconds, $N_c$ may be at least 0.178 blocks. Accordingly, the CPU 230 may begin to read blocks of input data from the shared memory device 220 after 0.178 blocks of input samples have been received by the shared memory device 220 to ensure that blocks of input samples may always be available for processing by the CPU 230. If $T_w=1250$ microseconds and $T_r=1100$ microseconds, $N_c$ may be at least 0.960 blocks. If $T_w=T_r$, $N_c$ may be at least zero blocks.

Each time the CPU 230 reads a block of input samples from the shared memory device 220, it frees a memory cell in the shared memory device 220 to receive additional input samples from the data input device 210. In this way, the shared memory device 220 need not be capable of storing all four thousand complex samples needed to compute the covariance matrix, $R_{\tilde{x}}\tilde{x}$. Accordingly, less memory storage is required to compute the covariance matrix, $R_{\tilde{x}}\tilde{x}$. As illustrated in the examples above, the shared memory device 220 may only need to store a fraction of the total number of blocks of input signals for a segment.

Even if $T_w > T_r$, the shared memory device 220 may only need to store a fraction of the total number of blocks of input signals in a segment. For example, at time $t=N_sT_w$ and for $N_c=0$, the number of blocks of input samples remaining in the shared memory device 230, $N_m$, may be given by the following equation:

$$N_m = N_s\left(1 - \frac{T_w}{T_r}\right) \quad (13)$$

If $T_w=T_r/2$, the shared memory device 220 may only need to store one of the total blocks of input samples in a segment.

The CPU 230 computes the covariance matrix, $R_{\tilde{x}}\tilde{x}$, for an i-th segment of input samples by computing a partial covariance matrix for each block of input samples for the i-th segment. The partial covariance matrix computation may be computed for the upper half of the covariance matrix, $R_{\tilde{x}}\tilde{x}$, because the covariance matrix, $R_{\tilde{x}}\tilde{x}$, is conjugate symmetric. Computing the partial covariance matrix in this way may result in a saving of approximately half the computation time. When the CPU 230 has computed the partial covariance matrices for each block of input samples for the i-th segment of input samples, the CPU 230 adds the partial covariance matrices together to compute the upper half of the covariance matrix, $R_{\tilde{x}}\tilde{x}$. The remaining half of the covariance matrix, $R_{\tilde{x}}\tilde{x}$, is filled in by taking the complex conjugate of the i-th row and j-th column element and putting that value in the j-th row and i-th column of the covariance matrix, $R_{\tilde{x}}\tilde{x}$. Once the covariance matrix, $R_{\tilde{x}}\tilde{x}$, is computed, the CPU device 230 may compute the filter coefficients, $\tilde{w}$, by first executing an LU decomposition algorithm which triangularizes the covariance matrix, $R_{\tilde{x}}\tilde{x}$ by decomposing it into the product of a lower triangular matrix and an upper triangular matrix. Triangularization decomposes the linear system to be solved into two triangular systems of equations, which are solved recursively. Following LU decomposition, alternative algorithms may be used to compute the filter coefficients, $\tilde{w}$, for different operational conditions. $\tilde{w}$. For example, U.S. application No. Ser. No. 10/035,676 (now U.S. Pat. No. 6,480,151), filed on even date herewith in the name of Khalil John Maalouf, Jeffrey Michael Ashe, and Naofal Al-Dhahir and entitled "A GPS Receiver Interference Nuller With No Satellite Signal Distortion," assigned to the assignee of the present application, which is hereby incorporated by reference, discloses algorithms that may be used to compute the filter coefficients, $\tilde{w}$.

Figure 4:
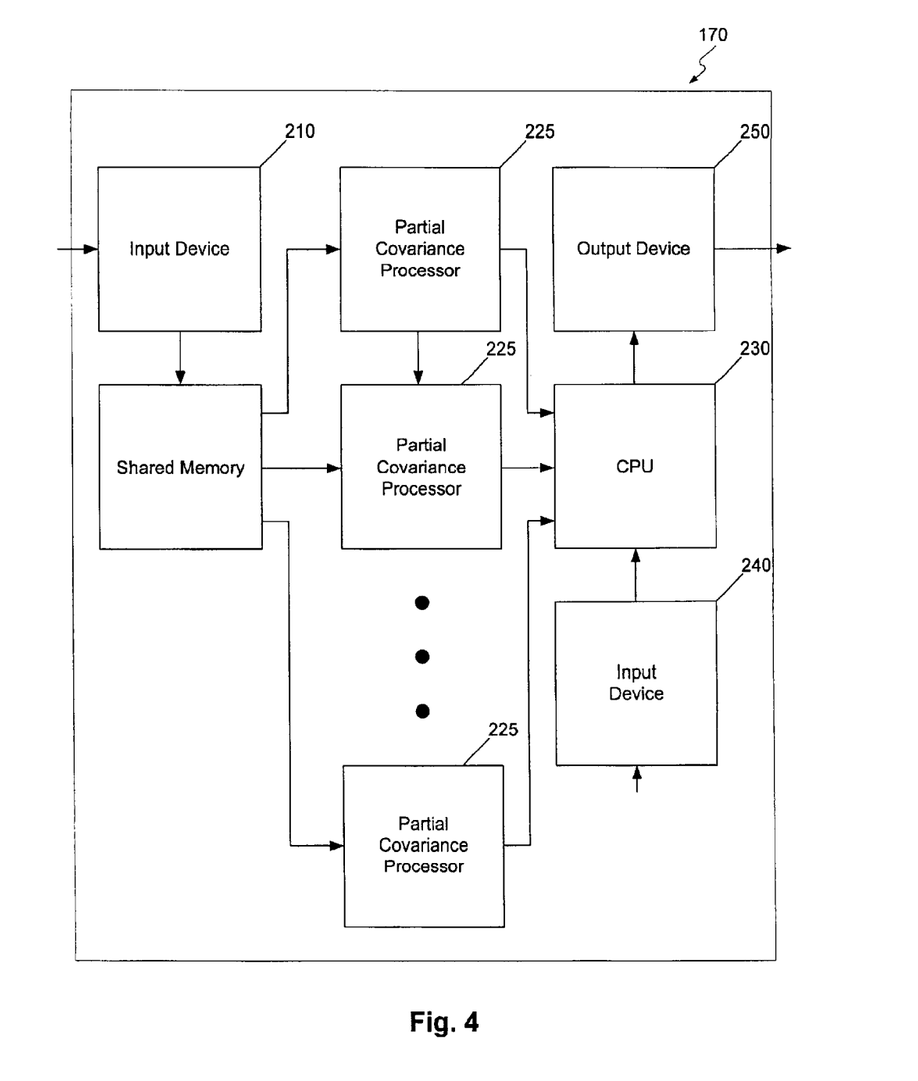
FIG. 4 illustrates another exemplary block diagram of a coefficient processor.
Figure 5:
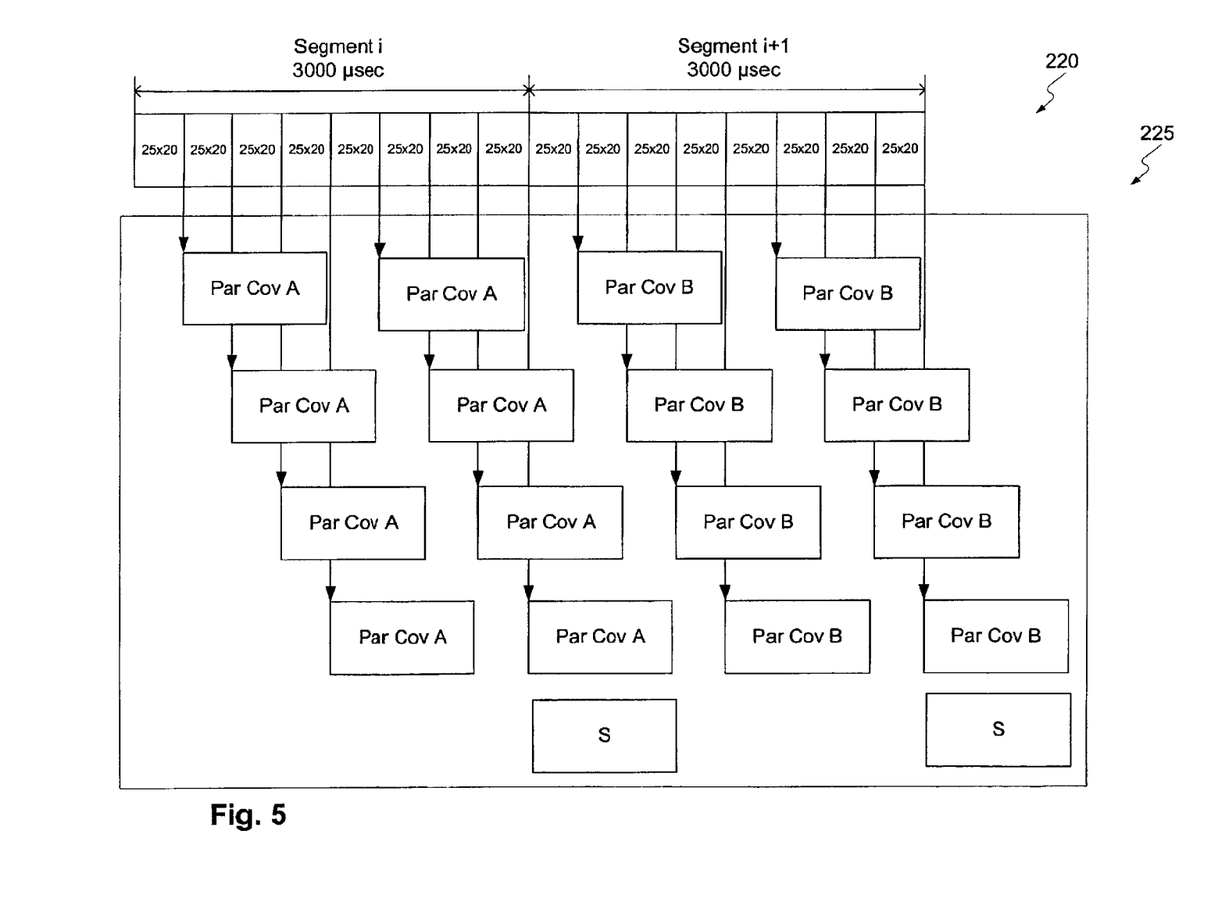
FIG. 5 illustrates an exemplary method for computing filter coefficients for the beamformer of FIG. 1 using the coefficient processor of FIG. 4.

Referring to FIG. 4, processing time for computing the covariance matrix, $R_{\tilde{x}}\tilde{x}$ may be further reduced by adding partial correlation processors 225 to the coefficient processor 170. FIG. 5 illustrates the process of the shared memory device 220 operating in parallel with the partial correlation processors 225 and the CPU device 230. Continuing with the example of a beamformer 100 having four antenna elements 160 (i.e., N=4) and five taps (i.e., M=5), the shared memory device 220 associates input samples in blocks of 25 by 20. The shared memory device 220 delivers at time $t_i$ an i-th block of 25 by 20 input samples to one of the partial correlation processors 225. The shared memory device 220 may continuously deliver blocks of 25 by 20 input samples to the partial correlation processors 225 evenly spaced in time every 375 microsecond, for example. Each time the shared memory device 220 delivers a block of input samples to the CPU 230, it frees a memory cell in the shared memory device 220 to receive additional input samples from the data input device 210. In this way, the shared memory device 220 need not be capable of storing all four thousand complex samples needed to compute the covariance matrix, $R_{\tilde{x}}\tilde{x}$.

Each partial correlation processor 225 receives a block of 25×20 input samples from the shared memory device 220 and computes a partial covariance matrix. The number of partial correlation processors 225 may be chosen so that a partial correlation processor 225 is always available to begin processing a block of data received from the shared memory device 220. As shown in FIG. 5, four partial correlation processors 225 are provided. The first partial correlation processor 225 receives the first block of input samples. While the first partial correlation processor 225 processes the first block of input samples, the second partial correlation processor 225 receives and processes the second block of input samples. While the first and second partial correlation processors 225 process the first and second block of input samples the third processor 225 receives and processes the third block of input samples. Finally, while the first, second, and third processors 225 process the first, second, and third block, the fourth processor 225 receives and processes the fourth block of input samples. When the fifth block of input samples is ready for processing, the first processor 225 is available to receive and process the fifth block. The remainder of the processors 225 are available to receive and process the remainder of the blocks of the segment of input samples.

When each partial correlation processor 225 finishes its computation, it delivers the result to the CPU device 230. When the CPU 230 receives the partial covariance matrices for a segment of input samples from the partial correlation processors 225, the CPU 230 adds the eight partial covariance matrices together to compute the covariance matrix, $R_{\tilde{x}\tilde{x}}$. The coefficient processor 170 of FIG. 5 may compute the covariance matrix, $R_{\tilde{x}\tilde{x}}$, in a faster time than the coefficient processor 170 of FIG. 3 because the multiple partial correlation processors 225 are available to read out and process the blocks of input samples quicker than the single CPU 230 of FIG. 3. For example, the coefficient processor 170 of FIG. 4 may reduce the processing time for computing the covariance matrix, $R_{\tilde{x}\tilde{x}}$, to 3 milliseconds from 10 milliseconds using the coefficient processor of FIG. 2.

The coefficient processors 170 described above assumed a beamformer 100 having four antenna elements 160 (i.e., N=4) and five taps (i.e., M=5). However, the coefficient processors 170 may be adapted for beamformers 100 having a variety of numbers of antenna elements 160 and taps. Adapting the coefficient processors 170 for a variety of beamformers 100 will be obvious to those of ordinary skill in the art.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for computing filter coefficients of a beamformer based on a segment of input samples comprising the steps of:
   dividing the segment of input samples into a plurality of blocks of input samples;
   receiving the plurality of blocks of input samples in a shared memory at a first rate wherein a first block of the plurality of blocks is received in a shared memory at a first time;
   reading the plurality of blocks of input samples from the shared memory at a second rate wherein the first block of the plurality of blocks is read from the shared memory at a second time,
   computing a plurality of partial covariance matrices for the plurality of blocks read from the shared memory;
   adding the plurality of partial covariance matrices.

2. The method of claim 1, wherein the segment of input samples corresponds to an N×S matrix of input samples and wherein the plurality of blocks of input samples correspond to L sub-matrices of the N×S matrix wherein the L sub-matrices are M×S matrices where M=N/L.

3. The method of claim 1, wherein the second time is delayed from the first time and the second rate is greater than or equal to the first rate.

4. The method of claim 1, wherein the second rate is less than the first rate.

5. A method for computing filter coefficients of a beamformer based on a segment of input samples comprising the steps of:
   dividing the segment of input samples into a plurality of blocks of input samples;
   receiving the plurality of blocks of input samples in a shared memory;
   reading the plurality of blocks of input samples by a plurality of partial covariance processors from the shared memory wherein each of the plurality of partial covariance processors compute a partial covariance matrix for each block of input samples read by the partial covariance processor;
   adding the plurality of partial covariance matrices.

6. The method of claim 5, wherein the segment of input samples corresponds to an N×S matrix of input samples and wherein the plurality of blocks of input samples correspond to L sub-matrices of the N×S matrix wherein the L sub-matrices are M×S matrices where M=N/L.

7. An apparatus for computing filter coefficients of a beamformer based on a segment of input samples wherein the segment of input samples are divided into a plurality of blocks of input samples, the apparatus comprising:
   a shared memory for receiving the plurality of blocks of input samples at a first rate wherein a first block of the plurality of blocks is received in a shared memory at a first time; and
   a processor for reading the plurality of blocks of input samples from the shared memory at a second rate, computing a plurality of partial covariance matrices for the plurality of blocks read from the shared memory, adding the plurality of partial covariance matrices,
   wherein the first block of the plurality of blocks is read from the shared memory at a second time, wherein the second time is delayed from the first time and the second rate is greater than the first rate.

8. An apparatus for computing filter coefficients of a beamformer based on a segment of input samples wherein the segment of input samples are divided into a plurality of blocks of input samples, the apparatus comprising:
   a shared memory for receiving the plurality of blocks of input samples; and
   a plurality of partial covariance processors for reading the plurality of blocks of input samples from the shared memory wherein each of the plurality of partial covariance processors computes a partial covariance matrix for each block of input samples read by that partial covariance processor;
   a processor for adding the partial covariance matrices computed by the plurality of partial covariance processors.

* * * * *